(12) United States Patent
Uchida et al.

(10) Patent No.: US 6,685,195 B2
(45) Date of Patent: Feb. 3, 2004

(54) GROMMET

(75) Inventors: Yoshimi Uchida, Yokkaichi (JP); Tsutomu Sakata, Yokkaichi (JP); Takashi Okuhara, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 10/255,949

(22) Filed: Sep. 27, 2002

(65) Prior Publication Data

US 2003/0062694 A1 Apr. 3, 2003

(30) Foreign Application Priority Data

Sep. 28, 2001 (JP) ........................................ 2001-303384

(51) Int. Cl.⁷ .............................. F16L 5/02; H01B 17/26
(52) U.S. Cl. .......................... 277/628; 277/607; 16/2.1; 174/65 G; 174/153 G
(58) Field of Search ................................. 277/606, 607; 16/2.1, 2.2; 174/31 R, 65 R, 65 G, 152 G, 152 R, 153 G, 167

(56) References Cited

U.S. PATENT DOCUMENTS

| | | | |
|---|---|---|---|
| 5,526,549 A | * 6/1996 | Mori et al. | ............. 16/2.1 |
| 5,739,475 A | 4/1998 | Fujisawa et al. | |
| 5,774,934 A | 7/1998 | Fujita et al. | |
| 5,856,635 A | 1/1999 | Fujisawa et al. | |
| 5,981,877 A | 11/1999 | Sakata et al. | |
| 6,058,562 A | 5/2000 | Satou et al. | |
| 6,240,597 B1 | 6/2001 | Mochizuki | |
| 6,267,385 B1 | 7/2001 | Okamoto et al. | |
| 6,339,196 B1 | * 1/2002 | Uchida | ............. 174/153 G |
| 6,353,185 B1 | 3/2002 | Sakata | |
| 6,402,155 B2 | 6/2002 | Sakata | |
| 6,465,740 B2 | * 10/2002 | Kondoh et al. | ......... 174/152 G |
| 6,495,767 B2 | 12/2002 | Okuhara et al. | |

FOREIGN PATENT DOCUMENTS

| | | |
|---|---|---|
| DE | 19904549 | 8/2000 |
| EP | 0888931 | 1/1999 |
| FR | 2547452 | 12/1984 |
| JP | 2-125518 | 10/1990 |
| JP | 6-231643 | 8/1994 |
| JP | 9-12161 | 3/1997 |
| JP | 9-69320 | 3/1997 |
| JP | 10-12072 | 1/1998 |
| JP | 11-27834 | 1/1999 |

OTHER PUBLICATIONS

English Language Abstract of 9–12161.
English Language Abstract of JP 10–12072.
English Language Abstract of JP 11–27834.
English Language Abstract of DE 199 04 549.
English Language Abstract of JP 9–69320.
English Language Abstract of FR 2547452.
English Language Abstract of JP 6–231643.

* cited by examiner

Primary Examiner—Anthony Knight
Assistant Examiner—Enoch Peavey
(74) Attorney, Agent, or Firm—Greenblum & Bernstein, P.L.C.

(57) ABSTRACT

A grommet has a plurality of projecting strip portions provided on an outer peripheral surface of a tapered portion, extending in an axial direction of the tapered portion and being spaced from each other in a circumferential direction. The grommet also has a plurality of grooves on the outer projecting strip portions. The grooves extend in the circumferential direction, and are configured to generate tactile sensation when the grommet is mounted into the through hole of the automobile body panel.

19 Claims, 15 Drawing Sheets

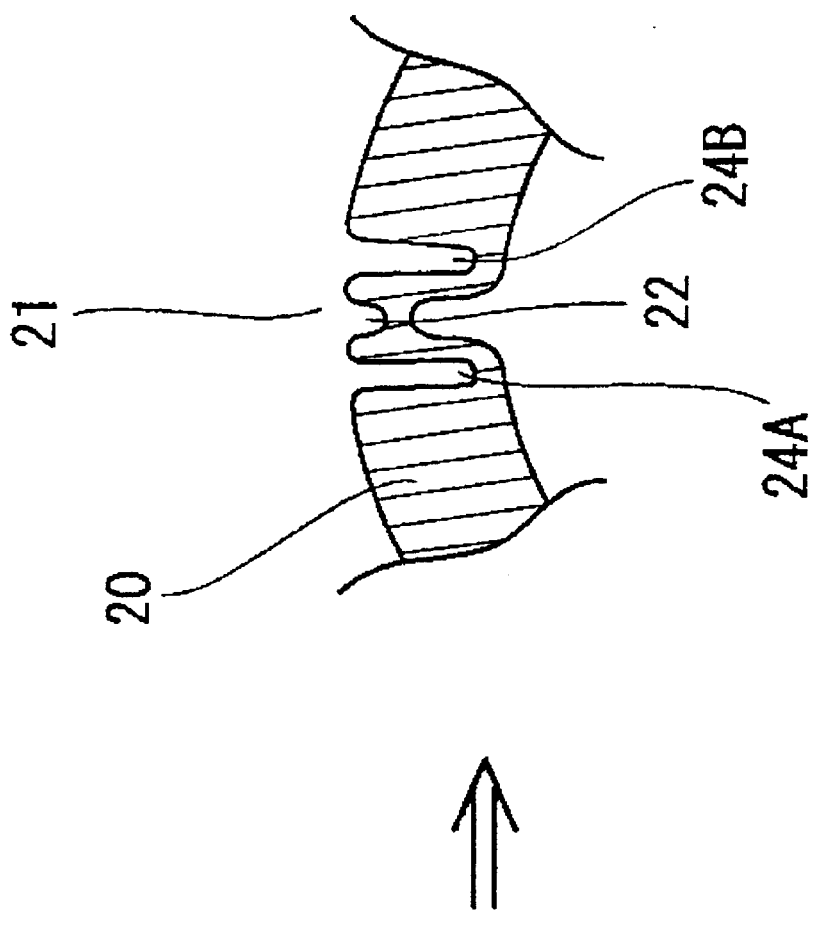
FIG. 10
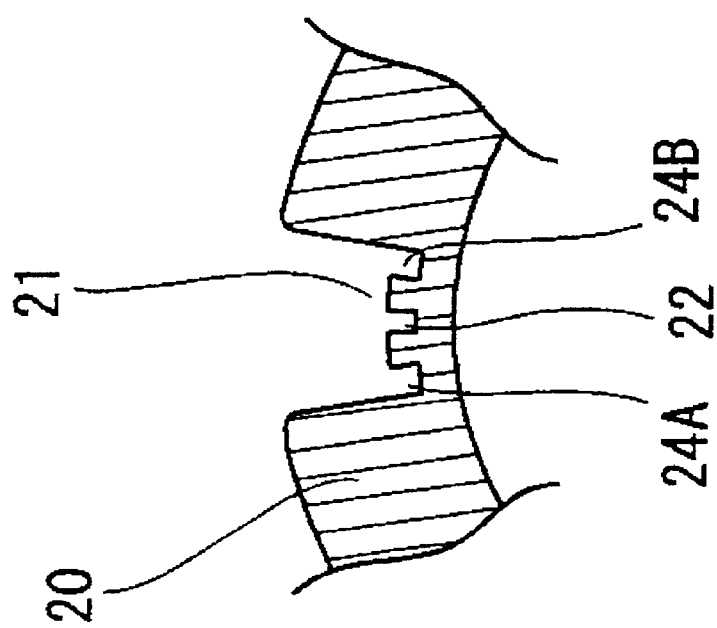

GROMMET

BACKGROUND OF THE INVENTION

1. Field of Invention

This invention relates to a grommet. In particular, this invention relates to a grommet that engages around a wire harness to be mounted on a vehicle, such as an automobile, and is mounted in a through hole of an automobile body panel, and improves protection of the wire harness at a position where the wire harness passes through the hole, as well as improving waterproofness and dustproofness.

2. Description of Related Art

Conventionally, a grommet engages around a wire harness to be mounted to extend from an engine compartment to a passenger compartment of an automobile, and the grommet is mounted in a though hole in an automobile body panel that divides the engine compartment from the passenger compartment. Thus, the wire harness passing through the through hole is protected, and intrusion of water, dust and sound from the engine compartment side to the passenger compartment side is prevented.

As the grommet described above, a so-called one motion grommet is provided. When the one motion grommet is simply pressed into the through hole in the automobile body panel from one side to the other, an automobile body engagement recess provided on an outer peripheral surface of the grommet engages with an edge of the through hole.

As shown in FIG. 12, the above-described grommet 1 is provided with a small-diameter tubular portion 2, and a tapered portion 3 which extends from an end of the small-diameter portion 2. The tapered portion 3 is provided with an automobile body engagement recess 4 around a larger diameter end. Both side walls facing each other across a groove 4a of the automobile body engagement recess 4 include a vertical wall 4b at the larger diameter side and an inclined wall 4c at a smaller diameter side. A wire harness W/H is inserted into a hollow portion extending from the small-diameter tubular portion 2 to the tapered portion 3 of the above-described grommet 1, and the grommet 1 is fixed with the wire harness W/H using a tape T at an end of the small-diameter tubular portion.

As shown in FIG. 13, during a mounting operation of the grommet 1 into the through hole R of the automobile body panel P, the grommet 1 is inserted into the through hole R from the small-diameter tubular portion 2, and the inclined wall 4c is pressed inwardly and deformed to pass through the through hole R. Then, the inclined wall 4c, which recovers its original shape after passing through the through hole R, and the vertical wall 4b are tightly pressed into contact with both surfaces of the automobile panel P, respectively. Thus, the automobile body engagement recess 4 of the grommet 1 engages with the through hole R of the automobile body panel P.

However, as shown in FIG. 14, when the one motion grommet 1 is inserted into the through hole R so as to be inclined, one side of the tapered portion 3 is pressed excessively, and thus, an outer peripheral surface of a thin portion of the tapered portion 3, extending to the inclined wall 4c of the automobile body engagement recess 4, is deformed inwardly. The inclined wall 4c, which must bend inwardly, is bent and warped (flipped over) outwardly, and the inclined wall 4c touches the automobile body panel P. Thus, the grommet is prevented from passing through the through hole R.

When the grommet 1 is inserted straight so that the center axis of the grommet 1 is aligned with the center of the through hole R, the above-described problem does not occur. However, during the insertion operation of the grommet 1 into the through hole, it is sometimes difficult to insert the grommet 1 into the through hole straight, because of the restriction on a space. Thus, in many cases, the grommet is inserted in an inclining posture.

Further, if the tapered portion of the grommet 1 is thick so as to be incapable of being bent, the above-described problem is resolved to a certain extent. However, in that case, an insertion force required to insert the grommet into the through hole becomes larger.

Also, during the insertion of the grommet, a largest force to be applied to press the grommet is required before the tapered portion passes through the through hole R. However, since an operator cannot recognize the position where the largest force to be applied is required, the operator tends to apply large force from the beginning, which increases an operational burden.

Accordingly, the present invention is provided in view of the above-described problems. An objective of the present invention is to prevent the insertion force from being too large, and to enable a grommet to be mounted into a through hole of an automobile panel, even if the grommet is inserted in an inclining posture. Another objective of the present invention is to generate tactile sensation so that the operator can recognize the position where the required force to press the grommet into the through hole without stopping is to be applied.

SUMMARY OF THE INVENTION

In order to address the problems described above, one aspect of the present invention provides a grommet configured to engage around an outer periphery of a wire harness and to be mounted in a through hole of an automobile body panel. The grommet includes a tubular portion and a tapered portion extending from one end of the tubular portion. The tapered portion includes an automobile body engagement recess provided on an outer peripheral surface of the tapered portion to engage with the automobile body panel. The recess is formed by a first wall provided around the tapered portion at a large-diameter end and a second wall provided around the tapered portion and located at a small-diameter side of the first wall, with the second wall facing the first wall across the automobile body engagement recess. A plurality of projecting strip portions are provided on an outer peripheral surface of the tapered portion. The plurality of outer projecting strip portions extend from an end adjacent the tubular portion toward an edge of the second wall of the recess in an axial direction of the tapered portion and are spaced from each other in a circumferential direction. A plurality of grooves are provided on the outer projecting strip portions, and extend in the circumferential direction. The plurality of grooves are configured to generate tactile sensation when the grommet is mounted into the through hole of the automobile body panel.

The plurality of grooves may be provided in the proximity of the edge of the second wall.

The grommet may have an inclined surface on an outer surface of the plurality of outer projecting strip portions and a substantially planar surface on an outer surface of the plurality of outer projecting strip portions. The substantially planar surface extends from a connecting position to the edge of the second wall in a direction substantially parallel to the axial direction of the tapered portion. The connecting position connects the inclined surface and the substantially planar surface. The plurality of grooves are provided on the substantially planar surface. The plurality of grooves may preferably be provided at a location nearer to the connecting position than to the edge of the second wall.

A projection amount of the plurality of outer projecting strip portions may be changed at a first point and a second point. The first point is located substantially at a position where an outer surface of the plurality of outer projecting strip portions first contacts an inner peripheral surface of the through hole when the grommet is inserted into the through hole from the side of the tubular portion. The second point is located nearer to the edge of the second wall than the first point. An outer surface of the plurality of outer projecting strip portions forms a substantially planar surface that extends between the second point to the edge of the second wall in a direction substantially parallel to the axial direction of the tapered portion. The grooves may be provided on the substantially planar surface. The grooves may be provided at a position nearer to the second point than to the edge of the second wall. The grooves may be provided between the first and second points and disposed at a position close to the second point.

When the outer projecting strip portions are provided on the outer peripheral surface of the grommet, and when the grommet is inserted in an inclining posture, the outer projecting strip portions first touch the inner peripheral surface of the through hole. Accordingly, the operator can recognize the inclined insertion, and reinsert the grommet in a straight manner.

Further, if the outer projecting strip portions are provided on the outer peripheral surface of the tapered portion, when the grommet is inserted in an inclining posture, the phenomenon in which the thin tapered portion extending to the inclined wall of the automobile body engagement recess is warped outwardly (flipped over) at the side contacting the inner peripheral surface of the through hole, does not occur. Accordingly, the problem that occurred at the time of inclined insertion in the conventional grommet can be obviated.

In a further aspect of the present invention, the projecting strip portions are arranged close to each other at the small-diameter side. If the projecting strip portions are arranged close to each other at the small-diameter side, it facilitates the correction of the direction at the time of inclined insertion. When the grommet is inserted in a straight manner, even if the projecting strip portions are arranged close to each other, since they do not contact the inner peripheral surface of the through hole, the inserting force does not increase. On the other hand, since the proportion of the total circumferential area that the outer projecting strip portions take up becomes smaller toward the large-diameter side, the grommet is easily bent in a diameter-reducing direction, and the inserting force can be reduced.

As described above, the grooves for tactile sensation are provided at a front side of the planar surface. Since the planar surface extends at the same height as that of the edge of the second wall, a large insertion force is required. From the position where the inner peripheral surface of the through hole of the automobile body (the inner surface of the burring when the burring projects from the through hole) contacts the groove, the through hole spreads out the groove as it moves. At the position where the through hole-moves over the groove, the groove reacts to recover its original shape, which generates a tactile sensation. Because of the tactile sensation thus generated, the operator can clearly recognize the position where he must apply the strongest pressing force, and thus needs not apply an excessive force from the beginning. Hence, the operator can mount the grommet into the through hole by merely applying the strongest force from the moment he has felt the tactile sensation. This reduces the burden on the operator.

The groove may be located at a position 2 mm–4 mm away from the edge of the second wall. The groove may have a depth extending to a position in the proximity of the outer peripheral surface of the tapered portion, or reaching the outer peripheral surface of the tapered portion, not including the outer projecting strip portions. In other words, the depth of the groove is equal to or less than the distance between upper and lower ends of the outer projecting strip portion. In a preferred embodiment, for example, the depth is about 1 mm.

The groove may have a substantially V-shaped or U-shaped cross section. The groove has an inclination angle $\theta 1$ at a side of the second wall and an inclination angle $\theta 2$ at the side of the tubular portion, relative to an axis extending perpendicularly to the axial direction of the tapered portion and passing through the lowermost bottom of the groove. The inclination angle $\theta 2$ is greater than the inclination angle $\theta 1$.

In other words, the tubular portion side of the groove, which the inner peripheral surface of the through hole (or the inner surface of the burring) contacts first, has a greater angle so that the tubular side of the groove can be easily deformed outwardly. On the other hand, the second wall side of the groove, which the inner peripheral surface of the through hole contacts later, has a smaller angle so that the groove recovers its original shape rapidly after the inner peripheral surface of the through hole moves over the groove.

More specifically, the inclination angle $\theta 1$ satisfies $0° \leq \theta 1 \leq 30°$, and the inclination angle $\theta 2$ satisfies $0° \leq \theta 2 \leq 80°$. Of course, the inclination angle $\theta 2$ may not necessarily be greater than the inclination angle $\theta 1$.

The grooves which are to be formed in the substantially planar surface of the outer projecting strip portions are preferably formed on all of the outer projecting strip portions. However, the grooves can be formed only on some of the outer projecting strip portions.

Preferably, a substantially V-shaped or U-shaped recess is provided in an inner peripheral surface of the tapered portion, and is located in the proximity of the second wall. The grooves for tactile sensation are provided on the outer surface of the outer projecting strip portions, and are located in the proximity of the second wall at a position opposite to the recess.

With the above construction, the thickness between the groove of the outer projecting strip portion and the recess of the inner peripheral surface of the tapered portion can be thin. Thus, the insertion force required to move the groove through the inner peripheral surface of the through hole can be reduced.

A sunken portion may be formed on the outer peripheral surface of the tapered portion between adjacent outer projecting strip portions. The sunken portion has at least one channel that extends in the axial direction and a first substantially planar surface that connects to the edge the edge of the second wall. The outer projecting strip portions include a second substantially planar surface that connects to the edge the edge of the second wall. The first and second substantially planar surfaces form a substantially coplanar surface at the side of the edge of the second wall. The substantially coplanar surface is continuous in the circumferential direction. The second substantially planar surface has a region that extends further toward the tubular portion than the first substantially planar surface. The grooves for tactile sensation are provided in the extended region.

As described above, since the substantially coplanar surface is provided at the edge of the second wall continuously in the circumferential direction, the grommet can be more fixedly secured in the through hole. Further, since the grooves are provided in the extended region that reaches further toward the tubular portion than the substantially planar surface of the sunken portion, the grooves can be easily deformed, thereby generating a stronger tactile sensation.

If a channel is provided in the sunken portion between adjacent outer projecting strip portions that extend in the axial direction, the grommet becomes easy to bend circumferentially since the portion of the groove is thinned. Accordingly, even if the grommet is inserted in an inclining posture and is hooked by the inner peripheral surface of the through hole, the grommet is bent circumferentially and the inserting posture is easily corrected. Further, when the outer surface of the projecting strip portions contacts the inner peripheral surface of the through hole, the tapered portion is easily bent inwardly about the groove, and the grommet is deformed in the diameter-reducing direction.

The channel can be a single center channel provided at the center of the sunken portion, or can be two side channels provided along the proximal portions of the projecting strip portions. It is possible to provide both the center channel and the two side channels. In this case, preferably, both side channels extend to the end of the second wall and the center channel extends only to the periphery of the end of the second wall, i.e., is shorter than the side channels.

As described above, if the single center groove is provided at the center of the triangle sunken portion, the grommet is easily bent about the center groove. Further, if the groove is provided along the proximal portion of the projecting strip portion, the proximal portion of the projecting strip portion is easily bent. Further, if both the single center groove and the two side grooves along the proximal portions are provided, the ease of bending is doubled.

In addition, the grooves for tactile sensation may be provided on an inclined surface connecting to the substantially planar surface, at a position close to the substantially planar surface, in the situation where the substantially planar surface is shorter.

The grommet of the present invention further has an end face portion provided at an end of a large-diameter side of the tapered portion, and a second tubular portion extending outwardly from the center of the end face portion. The second tubular portion is configured to receive at least one fixing element that fixes the second tubular portion to the wire harness. The end face has a greater thickness than the tapered portion not including the outer projecting strip portions.

As described above, since the thickness of the end face is great, even if a pulling force from the wire harness acts on the grommet through the second tubular portion, deformation of the grommet can be prevented, thereby generating a resisting force against the direction of the separation of the grommet from the through hole of the automobile body.

In another aspect of the present invention, a grommet configured to engage around an outer periphery of a wire harness and to be mounted in a through hole of an automobile body panel is provided. The grommet has a tubular portion and a tapered portion extending from one end of the tubular portion. An automobile body engagement recess is provided on an outer peripheral surface of the tapered portion to engage with the automobile body panel. A plurality of outer projecting strip portions are provided on an outer peripheral surface of the tapered portion. The plurality of outer projecting strip portions extend from an end adjacent the tubular portion toward the engagement recess in an axial direction of the tapered portion and are spaced from each other in a circumferential direction. A plurality of grooves are provided on the outer projecting strip portions, and extend in the circumferential direction. The plurality of grooves are provided in the proximity of the engagement recess so that the grooves generate tactile sensation prior to completion of the mounting of the grommet into the through hole of the automobile body panel.

An insertion facilitating recess may be provided in an inner peripheral surface of the tapered portion, preferably in the proximity of the engagement recess. The grooves for tactile sensation are provided on the outer projecting strip portions in the proximity of the engagement recess at a position opposite to the insertion facilitating recess.

In a further aspect of the present invention, a grommet configured to engage around an outer periphery of a wire harness and to be mounted in a through hole of an automobile body panel is provided. The grommet includes a tubular portion and a tapered portion extending from one end of the tubular portion. An automobile body engagement recess is provided on an outer peripheral surface of the tapered portion to engage with the automobile body panel. The recess is formed by a first wall provided around the tapered portion at a large-diameter end and a second wall provided around the tapered portion and located at a small-diameter side of the first wall. The second wall faces the first wall across the recess. A plurality of outer projecting strip portions are provided on an outer peripheral surface of the tapered portion. The plurality of outer projecting strip portions extend in an axial direction of the tapered portion and are spaced from each other in a circumferential direction. The plurality-of the outer projecting strip portions are arranged close to each other at a small-diameter end of the tapered portion and are radially spread apart toward a large-diameter end. The outer projecting strip portions are bent at a first point and a second point. The first point is located substantially at a position where an outer surface of the plurality of outer projecting strip portions first contacts an inner peripheral surface of the through hole when the grommet is inserted into the through hole from the side of the tubular portion. The second point is located nearer to the edge of the second wall than the first point. Formed on an outer surface of the plurality of outer projecting strip portions is a substantially planar surface that extends from the second point to an edge of the second wall in a direction substantially parallel to the axial direction. A plurality of grooves are provided on the substantially planar surface and extend in the circumferential direction. The plurality of grooves are configured to generate tactile sensation when the grommet is mounted into the through hole of the automobile body panel.

The grooves for tactile sensation may be provided at a position nearer to the second point than to the edge of the second wall. The substantially planar surface may be located at the same height as the edge of the second wall.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 10 is a view illustrating an action of a sunken portion 21 according to the first embodiment of the present invention;

DETAILED DESCRIPTION OF PREFERRED EMBODIMENTS

Figure 1:
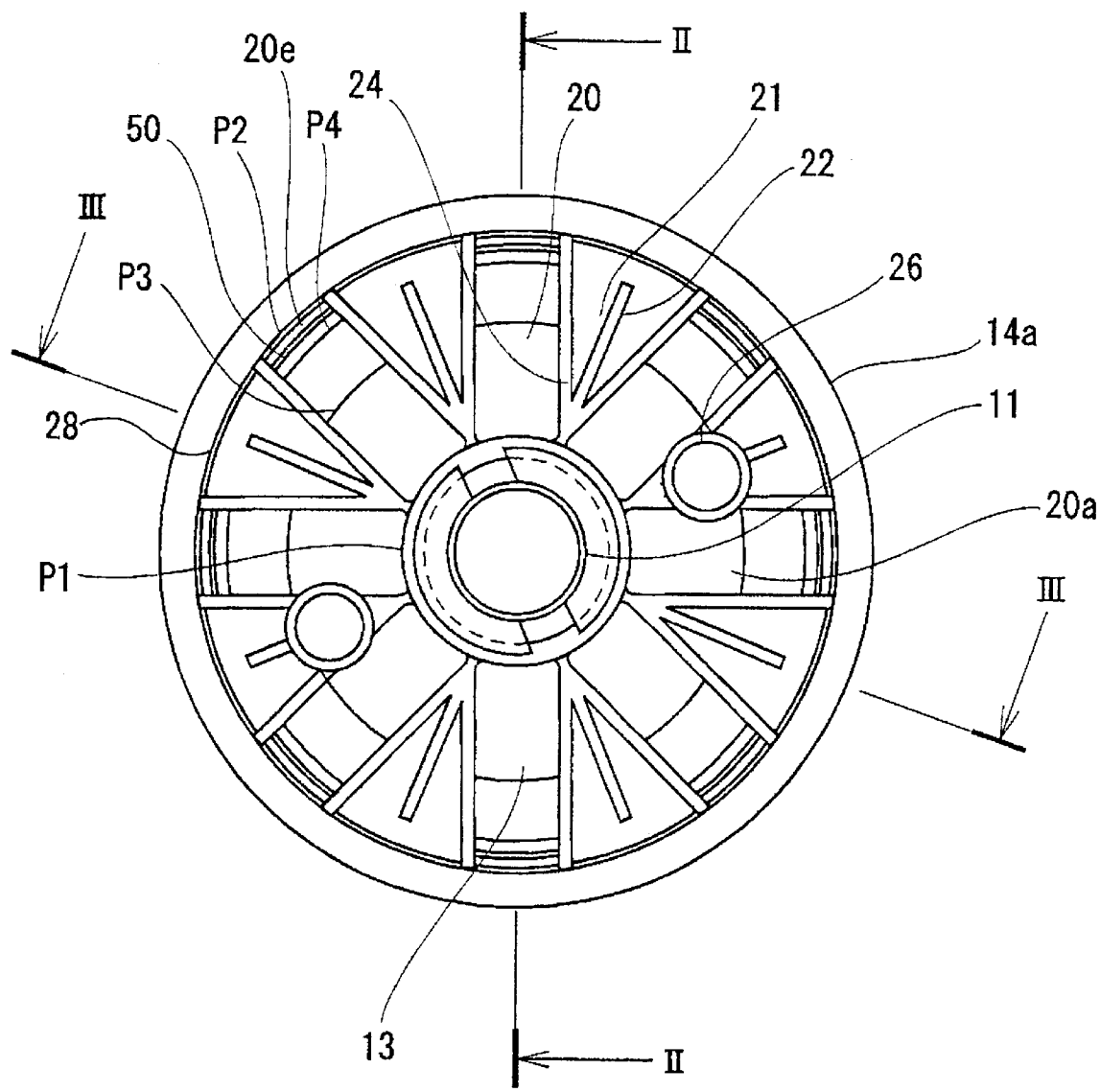
FIG. 1 is a front view of a grommet according to a first embodiment of the present invention.
Figure 2:
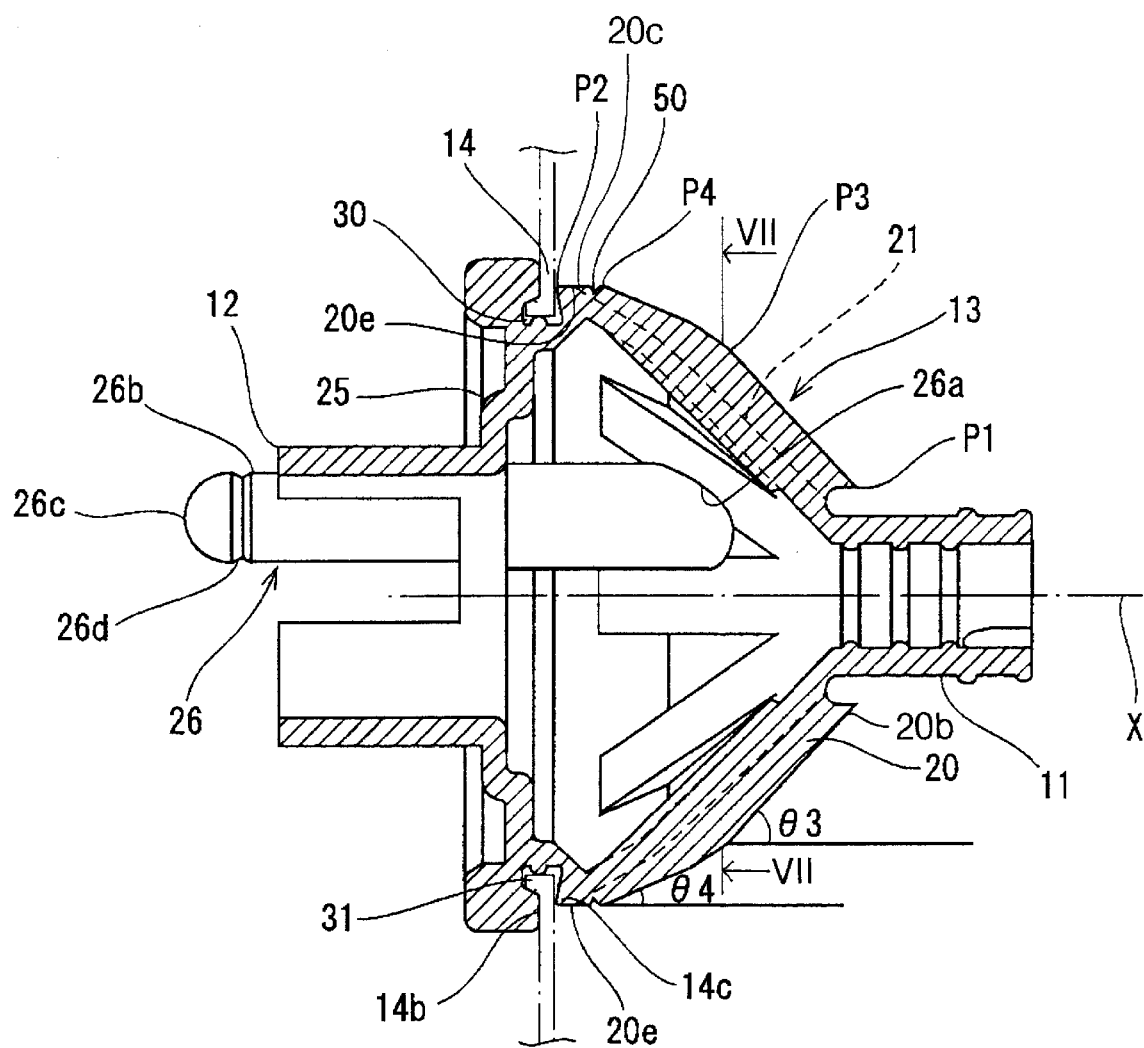
FIG. 2 is a cross-sectional view of the grommet shown in FIG. 1 taken along the line II—II of FIG. 1.
Figure 3:
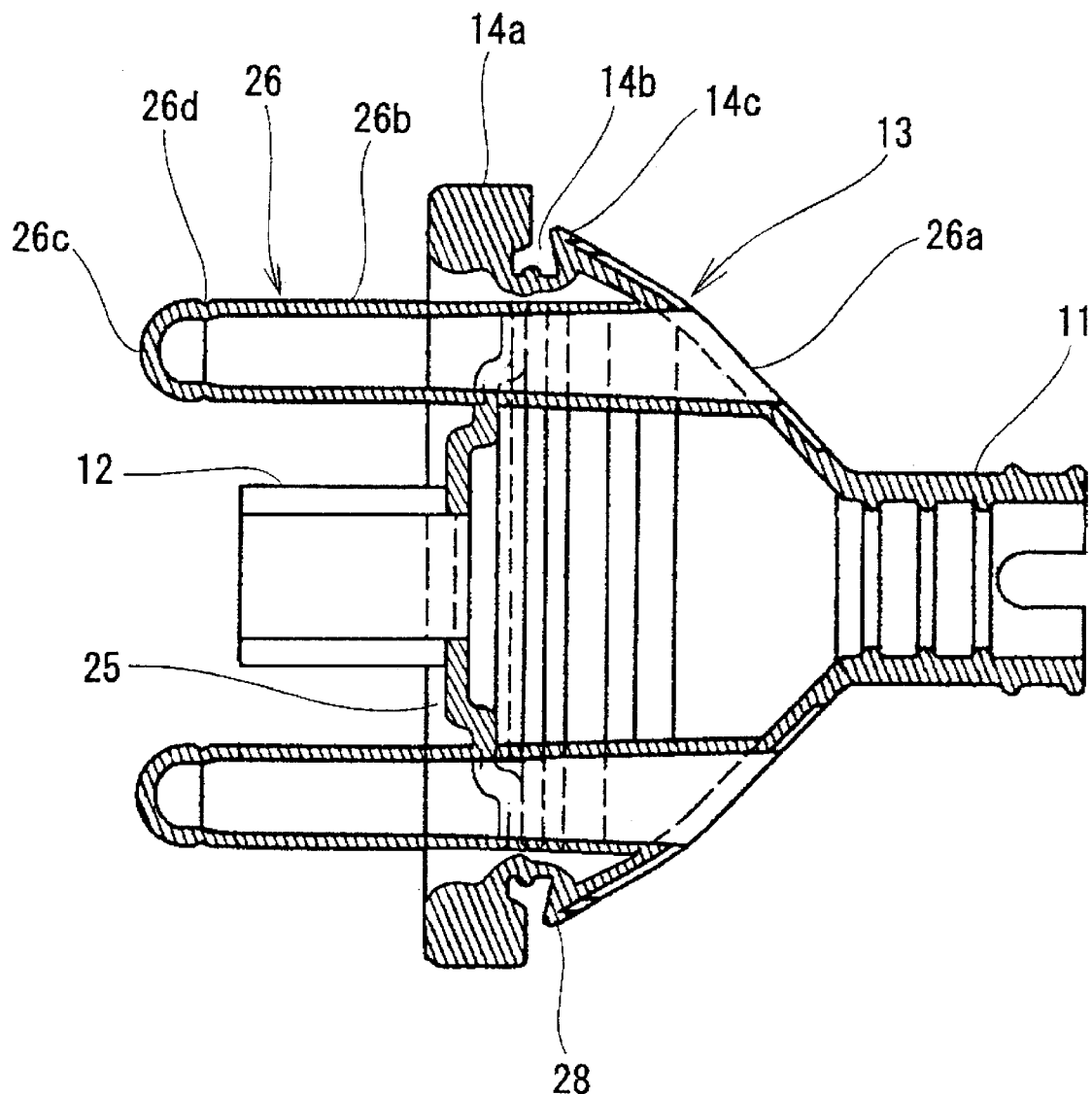
FIG. 3 is a cross-sectional view of the grommet shown in FIG. 1 taken along the line III—III of FIG. 1.
Figure 4:
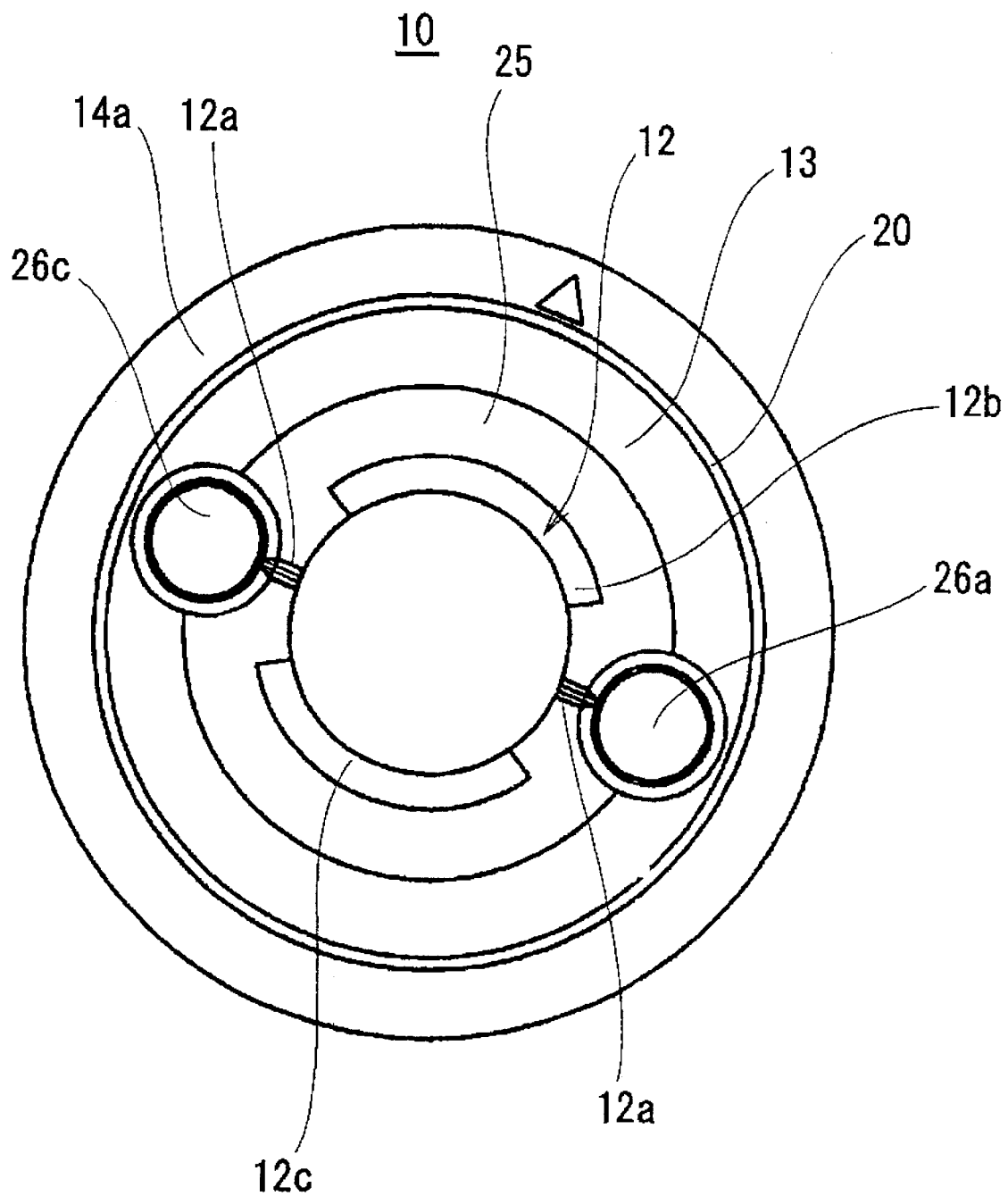
FIG. 4 is a rear view of a grommet of the first embodiment according to the present embodiment.

The embodiments of the present invention will be described with reference to drawings.

FIGS. 1–10 illustrate a first embodiment of the present invention.

A grommet 10 is made of a suitable elastic material, such as rubber and elastomer, and is formed unitarily and in one piece. The grommet 10 includes a first small-diameter tubular portion 11, which is positioned at the front side in an inserting direction, and a second small-diameter tubular portion 12, which is positioned at the rear side of the inserting direction, and a tapered portion 13 extending between the first small-diameter tubular portion 11 and the second small-diameter tubular portion 12. The tapered portion 13 has a generally conical shape whose diameter is enlarged from an end connecting to the first small-diameter tubular portion 11 to the other end, and has a thickened portion around a large-diameter end, and an automobile body engagement recess 14 on an outer peripheral surface thereof.

The side walls of the automobile body engagement recess 14 has a first wall (in the form of a vertical wall 14a) that includes a portion projecting toward the front end side, a channel 14b and a second wall (in the form of an inclined wall 14c) that faces the vertical wall 14a across the channel 14b. The channel 14b has front and rear hollow portions 14d and 14e at the inner part thereof (note FIG. 5), as well as a lip 14h projecting from the trough bottom surface.

A plurality of outer projecting strip portions 20 are provided on the outer peripheral surface of the tapered portion 13. The plurality of outer projecting strip portions 20 are spaced from each other in a circumferential direction, and extend in the axial direction of the tapered portion 13 between a small-diameter side, connecting to the small-diameter tubular portion 11, and the large-diameter side of the inclined wall 14c of the automobile body engagement recess 14. The outer projecting strip portions 20 have a rib-shape, i.e., project from the outer peripheral surface of the tapered portion 13 to provide a thickened and a stepped shape.

In the present embodiment, eight outer projecting strip portions 20 extend in the axial direction between the small-diameter end P1 and the large-diameter end P2, and have a constant width in the circumferential direction throughout the axial direction. The eight outer projecting strip portions 20 have an identical shape.

In the present embodiment, the width W of each outer projecting strip portion 20 is about 10 mm, and the length L in the axial direction is about 14.8 mm. The outer diameter D of the outer projecting strip portion 20 at the edge of the inclined wall (position P2) is about 76 mm, and the outer diameter at the small-diameter end (position P1) is about 63.9 mm. Of course, the above dimensions are merely exemplary, and any suitable dimensions may be utilized.

The projection amount H of the outer projecting strip portion 20 projecting from the outer peripheral surface of the tapered portion 13 is changed at the position of a contact point P3, which contacts an inner peripheral surface 30a of the through hole (i.e., an inner surface of a burring that projects from the through hole) during the insertion of the grommet 10 into the through hole 30. Thus, the projection amount H2 between the contact point P3 and the position P2, which is the edge of the inclined wall, is smaller than the projection amount H1 between P3 and the small-diameter end P1 (note FIG. 5).

Figure 5:
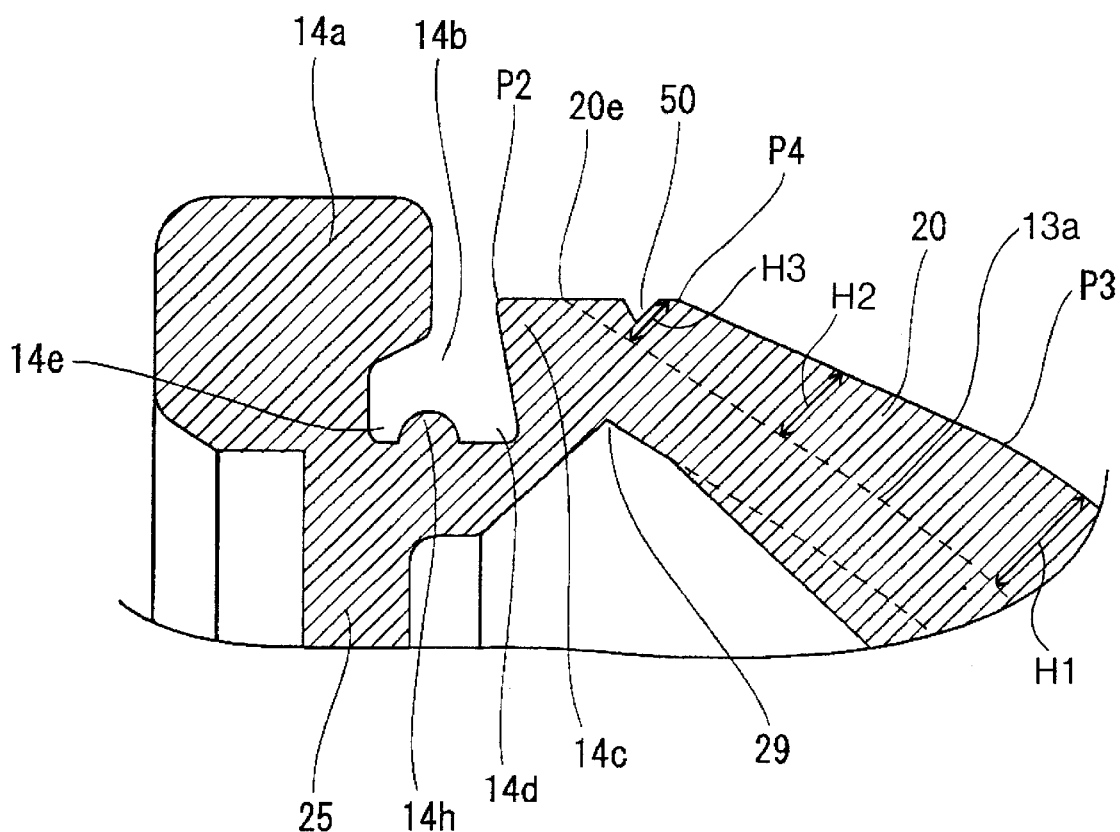
FIG. 5 is a partial enlarged view of the grommet shown in FIG. 2.

Further, the outer peripheral surface 20a of the outer projecting strip portion 20 forms a planar surface 20e, as shown in FIG. 5, that extends from the position P4 to the edge P2 of the inclined wall 14c in a straight manner in a direction substantially parallel to the axial direction X of the grommet. At the position P4, the height of the outer surface 20a of the outer projecting strip portion 20 (from the axis) becomes the same as the height of the edge P2 (from the axis) of the inclined wall 14c. The length of the planar surface 20e connecting to the edge of the inclined wall is about 4 mm.

As described above, the projection amount of each outer projecting strip portion 20 has a largest height H1 between P1 at the small-diameter end and the small-diameter side of the position P3. The projection amount H2 between P3 and P4 satisfies H1>H2. Thus, the outer surface 20a is bent. Further, the projection amount H3 between P4 and the edge P2 of the inclined wall 14c is less than H2 and decreases gradually.

Thus, the inclination angle θ of the outer surface 20a of each outer projecting strip portion 20 with the axis X changes between two levels, θ3 and θ4. At the small-diameter tubular portion side, the inclination angle θ3 has the largest angle. At the contact point P4, the inclination angle is decreased to θ4. Further, at the position where the height of the outer surface 20a (from the axis) becomes the same as the height of the edge of the inclined wall 14c, the inclination angle is set to 0. Thus, the shape of the outer surface 20a changes by bending at three levels.

Since the width of each outer projecting strip portion 20 is constant along the axis X, the outer projecting strip portions 20 are radially spread apart from the small-diameter end PI to the large-diameter end P2. At the end portion 20b of the outer projecting strip portion 20 at the small-diameter end P1, adjacent outer projecting strip portions 20 are arranged close to each other. At the end portion 20c of the outer projecting strip portion 20 at the large-diameter side P2, adjacent outer projecting strip portions are spaced from each other. Accordingly, triangular sunken portions 21, which define the outer peripheral surface 13a of the tapered portion 13, are generated so as to be widened from the small-diameter side to the large-diameter side.

As shown in FIG. 5, a groove 50 for tactile sensation is provided on the planar surface 20e connecting to the edge P2 of the inclined wall 14c at a location close to the position P4. The groove 50 has a substantially V-shaped cross section, and extends in the circumferential (width) direction. In this embodiment, the groove 50 is located at a position 3 mm away from the position P2. The groove 50 has a depth extending toward the lower end of the outer projecting strip portion 20, i.e., the outer peripheral surface of the tapered portion 13. In this embodiment, the depth of the groove 50 is about 1 mm. Of course, the groove 50 may have a depth that extends to the lower end of the outer projecting strip portion 20, i.e., the outer peripheral surface of the tapered portion 13.

Figure 6:
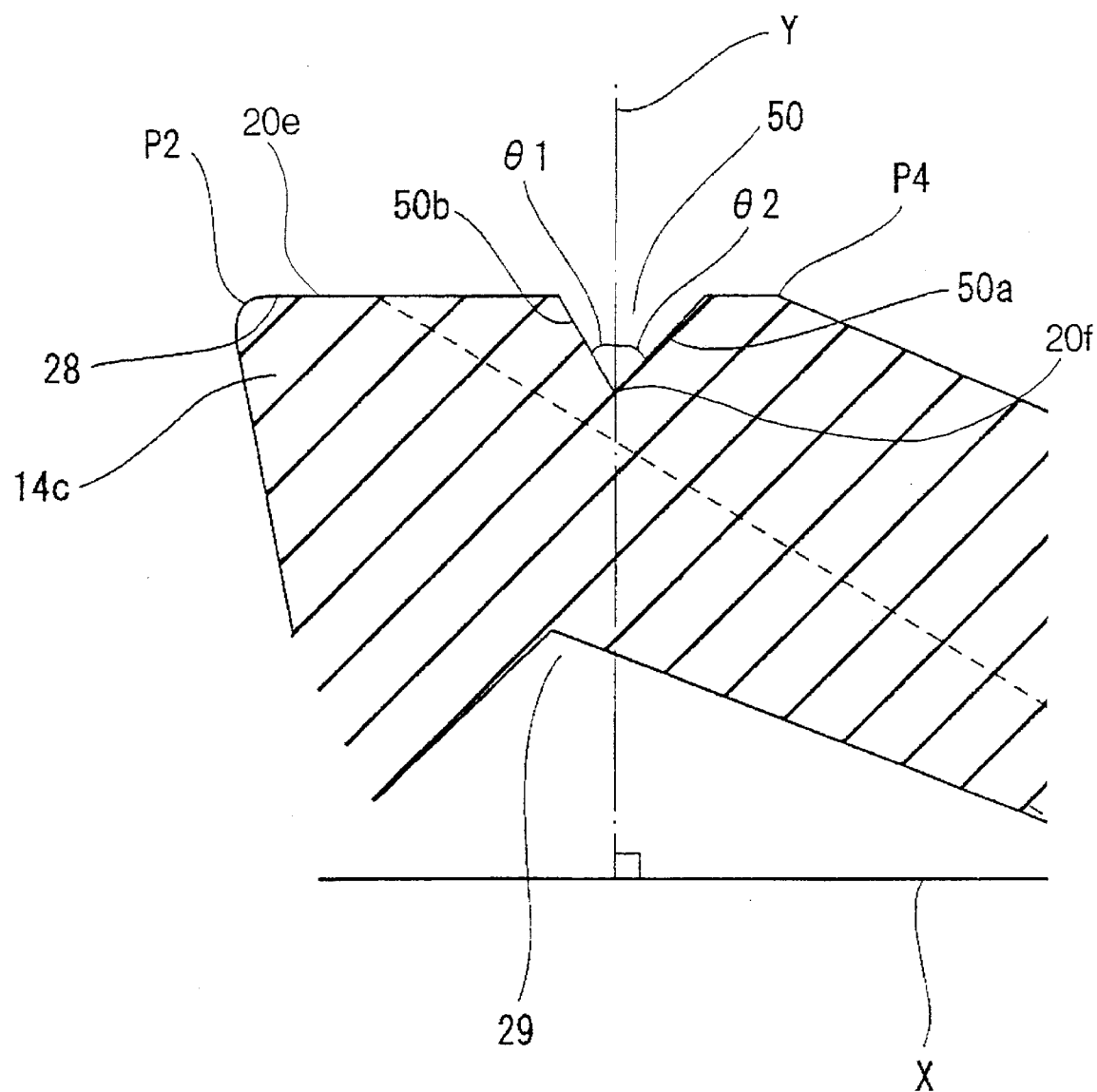
FIG. 6 is an enlarged view of a groove 50 of the grommet shown in FIG. 5.

As shown in FIG. 6, the groove 50 of the substantially V-shaped cross section has an inclination angle θ1 at a side of the edge P2 of the inclined wall 14c and an inclination angle θ2 at a side of the small-diameter tubular portion, relative to the axis Y which extends perpendicularly to the axis X and the longitudinal direction of the groove 50 and which passes through the lowermost bottom 20f of the groove 50. The inclination angle θ2 is greater than the inclination angle θ1. In this embodiment, the inclination angle θ1 is about 30°, and the inclination angle θ2 is about 45°.

Figure 7:
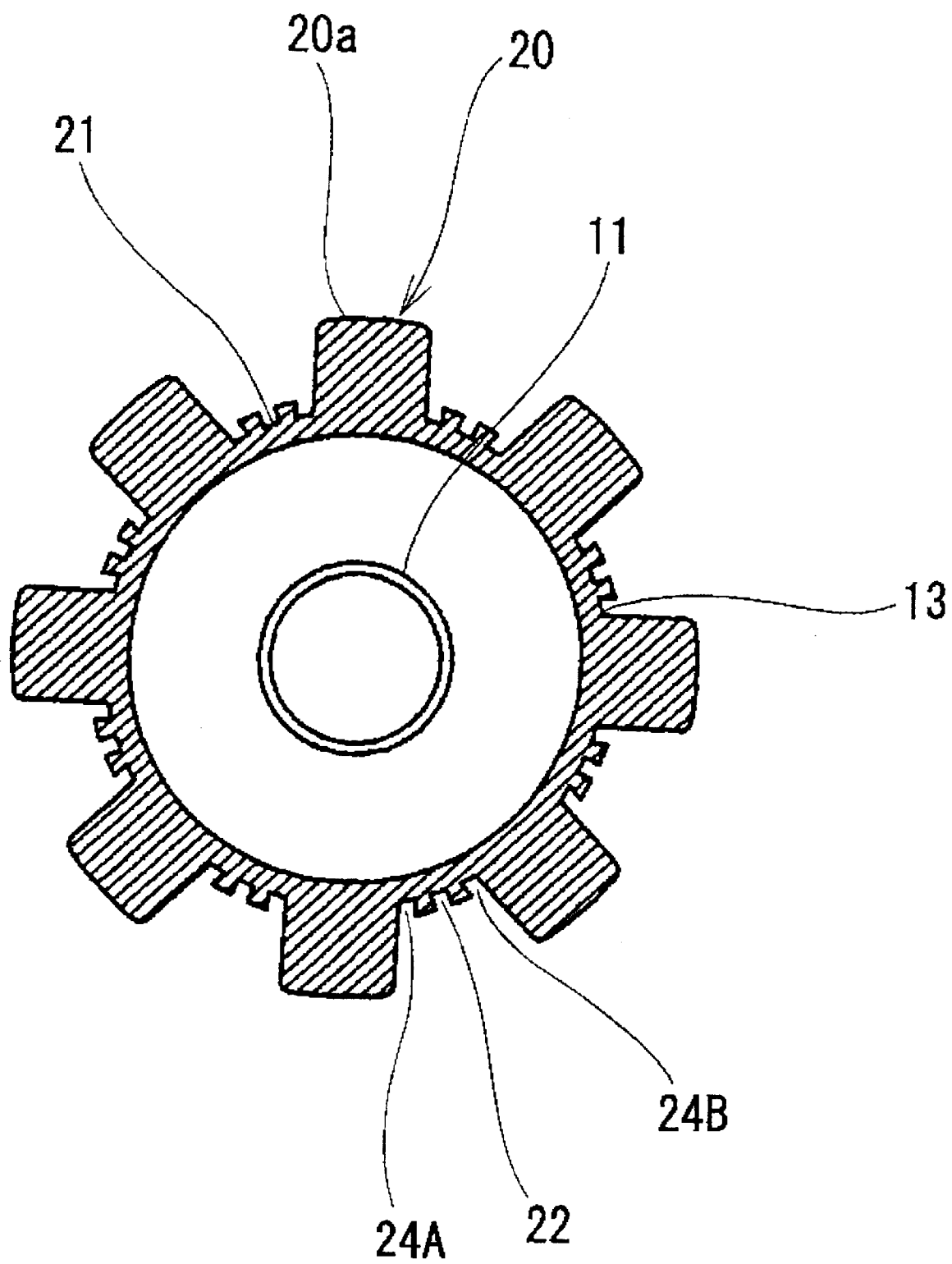
FIG. 7 is a cross-sectional view of the grommet shown in FIG. 2 taken along the line VII—VII of FIG. 2.

At the center in the circumferential direction of the sunken portion 21 between the outer projecting strip portions 20, a center channel 22 is provided (note FIG. 7). Further, outer side channels 24A and 24B are provided along the proximal portion of the outer projecting strip portion 20. The outer side channels 24A and 24B extend to the edge P2 of the inclined wall. The center channel 22 is shorter than the both of the outer side channels 24A and 24B. In other words, an end of the center channel 22 does not extend toward the edge of the inclined portion (wall) as far as the ends of both the outer side channels 24A and 24B.

Due to these channels 22, 24A and 24B, even if the stiffness of the tapered portion 13 is increased by providing the outer projecting strip portions 20 thereon, the tapered portion 13 can be easily bent (deformed) in a diameter-reducing direction when the tapered portion 13 is being inserted into the through hole of the automobile body panel. In other words, the channels 22, 24A and 24B guide the tapered portion 13 in a direction to fold the sunken portion 21 so that the tapered portion reduces the diameter thereof without unreasonable force.

As shown in FIGS. 1 and 6, provided in the sunken portion 21 at a location adjacent the edge P2 of the inclined wall 14c is a planar surface 28 which extends at the same height as the position P2. The length of the planar surface 28 is about 2 mm from the position P2, and is less than that of the planar surface 20e. The groove 50 for tactile sensation is provided at a region of the planar surface 20e which extends further toward the small-diameter tubular portion 11.

Further, a recess 29 which is substantially V-shaped in cross-section is provided in an inner peripheral surface of the tapered portion 13. The groove 50 for tactile sensation is provided at a location outwardly of the recess 29 which corresponds to the recess 29, thus reducing the thickness between the recess 20 and the groove 50.

An end face portion 25 is provided at the end of the large-diameter side of the above-described tapered portion 13, and a second small-diameter tubular portion 12 extends outwardly from the center of the end face portion 25. Slits 12a are provided in the second small-diameter tubular portion 12 so as to face each other. Thus, the small-diameter tubular portion 12 is divided into two semi-tubular pieces 12b and 12c. The thickness of the end face portion 25 is made relatively great by making it more than that of the tapered portion 13 (i.e., the sunken portion 21 without the outer projecting strip portion 20).

The grommet 10 is further provided with two cable insertion tubular portions 26 to connect to optional components, such as a washer fluid tube, a Bowden cable, or an electrical cable separate from the wire harness. Each cable insertion tubular portion 26 includes an opening 26a in the sunken portion 21 of the outer peripheral surface of the tapered portion 13, passes through the interior of the tapered portion 13, and extends outwardly from the end face portion 25. The end of the extending portion 26b has a closed portion 26c. When a cable is to be inserted thereinto, the cutting portion 26d is cut to make an opening. Of course, cutting portion 26d may be formed as a frangible portion to be broken with a suitable force.

Figure 8A:
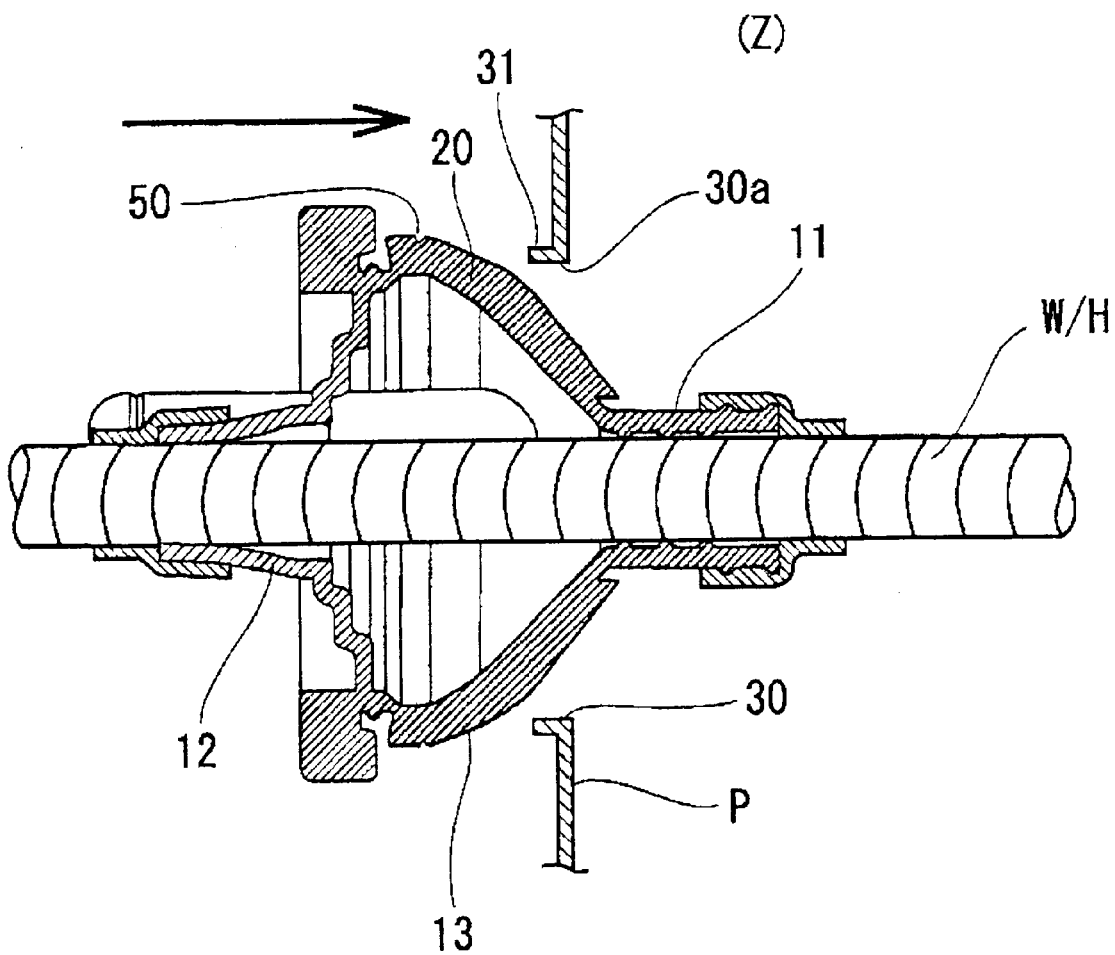
FIGS. 8A, 8B and 8C are views illustrating a grommet being inserted into a through hole according to the first embodiment of the present invention.
Figure 8B:
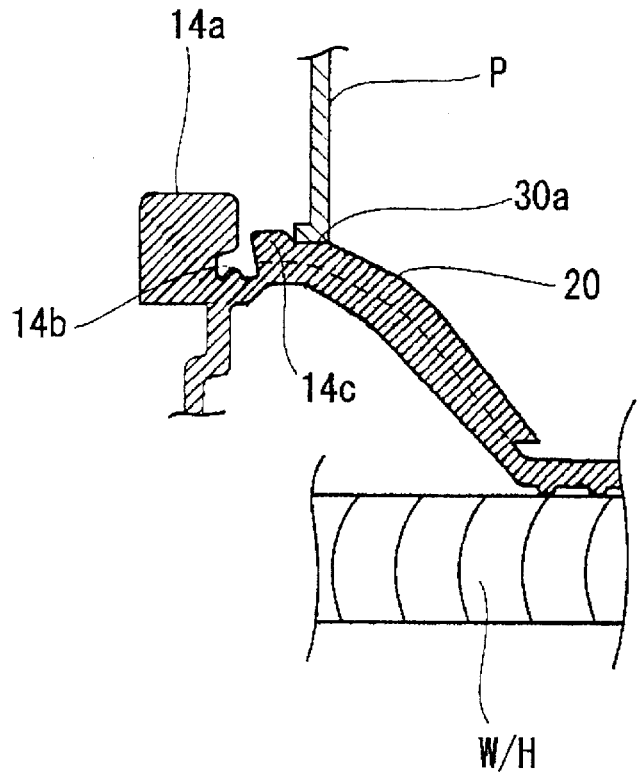
Figure 8C:
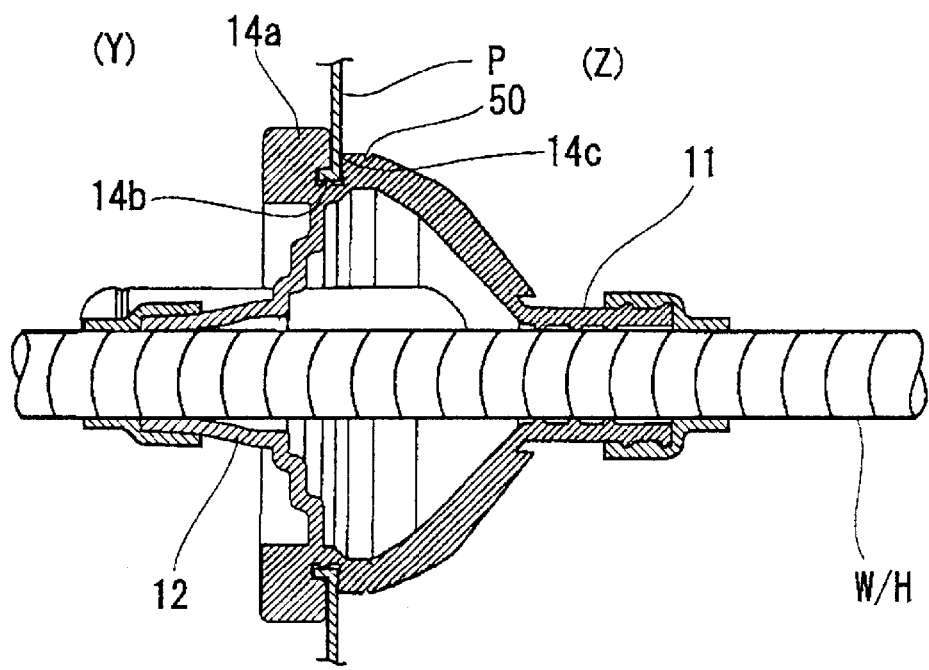
Figure 9A:
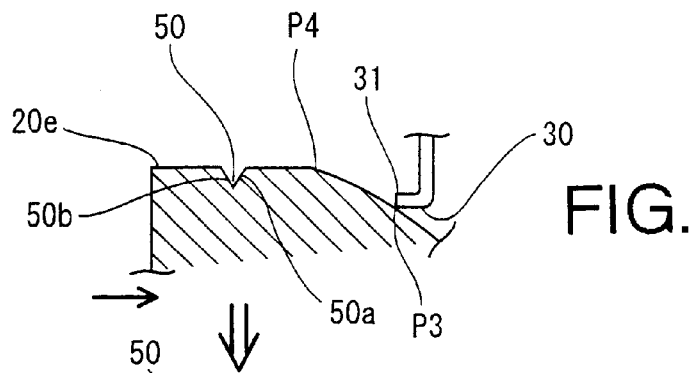
FIGS. 9A, 9B, 9C, 9D, 9E and 9F are views illustrating the operation of the groove 50 according to the first embodiment of the present invention.
Figure 9B:
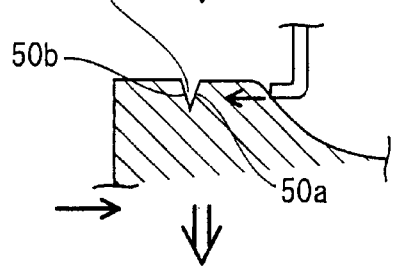
Figure 9C:
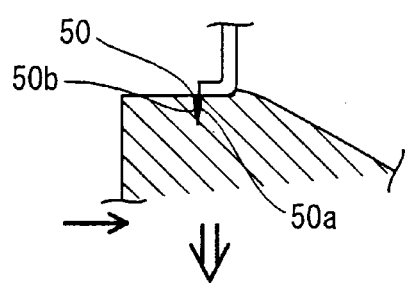
Figure 9D:
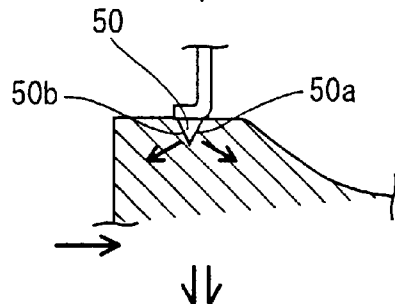
Figure 9E:
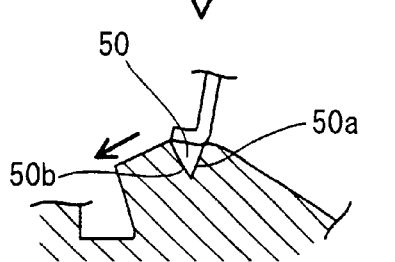
Figure 9F:
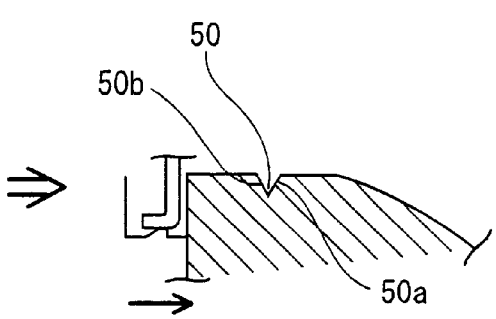

As shown in FIGS. 8A–8C, the above-described grommet 10 first engages around the wire harness W/H, and then, the grommet 10 is mounted into the through hole 30 of the automobile body panel P, which is a dash panel dividing the outside (Y) of the passenger compartment from the passenger compartment side (Z). As shown in FIGS. 8A and 8C, both the first small diameter tubular portion 11 and the second small diameter tubular portion 12 can be fixed to the wire harness W/H by any suitable fixing element, such as by tape.

A mounting operation of the above-described grommet 10 is described hereinafter.

The first small-diameter tubular portion 11 is pressed into the through hole 30 from the outside (Y) of the passenger compartment. At this time, if the grommet 10 is inclined, a portion of the outer projecting strip portions 20 touches the inner peripheral surface of the through hole 30 and contact resistance occurs. Accordingly, the operator corrects the inserting posture of the grommet 10.

In addition, since a plurality of outer projecting strip portions 20 are provided on the outer peripheral surface of the thin tapered portion 13, the stiffness of the tapered portion 13 increases. Accordingly, when the grommet 10 is inserted in an inclined posture, a portion of the tapered portion 13, which is in contact with the inner peripheral surface of the through hole, is positively prevented from being bent and deformed.

When the tapered portion 13 of the grommet 10 is being inserted into the through hole 30 and the contact point P3 of the outer projecting strip portions 20, where the inner diameter of the through hole 30 is equal to the outer diameter of the grommet 10, reaches the position of the through hole 30, the operator feels the first tactile sensation by the contact of the outer surface 20a of the outer projecting strip portions 20 with the inner peripheral surface of the through hole 30.

From this moment, the operator presses the grommet 10 with a relatively large force and inserts the grommet 10 into the through hole 30 by deforming the outer projecting strip portions 20 inwardly.

Referring to FIGS. 9A–9F, when the edge of a burring 31 of the through hole 30 is pressed from the contact points P3 to P4, and then further pressed to the groove 50, the side surfaces 50a, 50b of the groove 50 provided on the planar surface 20e move toward each other, closing or nearly closing the groove 50 in the axial direction. When the edge of the burring 31 contacts the side surface 50b provided at the side of the edge P2 of the inclined wall 14c, the side surfaces 50a, 50b move away from each other, spreading out the groove 50 in the axial direction.

Thereafter, the edge of the burring 31 moves forward, while pushing the side surface 50b toward the edge P2 of the inclined wall 14c, so that the inclined wall 14c deflects into the engagement recess 14. As soon as the entire burring 31 moves over the side surface 50b and the remaining portion of the planar surface 20e, the side surface 50b is released from the pressure of the burring 31. Accordingly, the groove 50 recovers its original shape instantaneously. In this manner, the groove 50 provides the second tactile sensation to the operator pressing the grommet into the through hole of the automobile body.

After the burring 31 moves over the groove 50, the distance the burring 31 has to move from there to the edge P2 of the inclined wall 14c is only 3 mm. When the grommet is further pressed forward 3 mm from there, the burring 31 can be fixedly secured within the engagement recess 14 of the grommet. Thus, the grommet 10 can be pressed without stopping from there. Since the operator can recognize the tactile sensation just before the completion of the mounting operation of the grommet, unnecessary pressing force is no longer required to be applied to insert the grommet into the through hole.

More in detail, as shown in FIG. 10, since the sunken portion 21 provided between the outer projecting strip portions 20 includes channels 22, 24A and 24B, the sunken portion 21 is easily bent in the circumferential direction. Accordingly, the sunken portions 21 are deformed and bent to form an outwardly swollen ridge shape between adjacent outer projecting strip portions 20, which narrows the space therebetween while the diameter is being reduced. Thus, the tapered portion 13 having the outer projecting strip portions 20 can smoothly reduce the diameter thereof.

In addition, since the inclination angle of the outer projecting strip portion 20 is gentle and the projection amount from the outer peripheral surface of the tapered portion 13 is small, a strong pressing force is not required, and thus, the insertion of the grommet 10 can be performed with a low inserting force.

Further, since the planar surfaces 20e, 28 of the outer projecting strip portion 20 and the sunken portion 21 are provided a distance about 2 mm from the edge P2 of the inclined wall 14c, the edge of the inclined wall 14c is guided to pass through the through hole straightly.

As described above, the outer surface 20a of the outer projecting strip portions 20 is pressed by the inner peripheral surface of the through hole 30, and the edge of the inclined wall 14c is forced to pass through the through hole 30 while the diameter of the tapered portion 13 is reduced.

When the inclined wall 14c has passed through the through hole 30, the original position (shape) is elastically recovered, and the peripheral edge portion of the through hole 30 is pressed into the channel 14b between the inclined wall 14c and the vertical wall 14a. In this condition, the facing surfaces of the inclined wall 14c and the vertical wall 14a are pressed toward each other and contact opposite surfaces of the automobile body panel P, and the inner peripheral surface of the through hole 30 is pressed into contact with the lip 14h projecting from the trough bottom surface. Thus, the grommet 10 engages with the through hole 30 of the automobile body panel P in a sealing condition.

As described above, since the grommet 10 has the outer projecting strip portions 20 on the outer peripheral surface of the tapered portion 13, the operator can correct an inclined insertion posture, the thin tapered portion is reinforced, and bending, which easily occurs at the time of inclined insertion, can be prevented. Thus, even if the grommet 10 is inserted in an inclining posture, the grommet 10 is not prevented from being inserted into the through hole 30.

Further, at the periphery of the edge of the inclined wall 14c, the planar surface 20e and the planar surface 28 are provided on the outer projecting strip portion 20 and the sunken portion 21, respectively. The groove 50 for tactile sensation is provided on the planar surface 20e of the outer projecting strip portion 20, so that the operator feels and recognizes the tactile sensation. Because of the planar surfaces 20e, 28, the inclined wall 14c is guided to pass through the through hole 30 in a straight posture. Accordingly, deformation does not occur at the periphery of the edge of the inclined wall, and thus, the inclined wall can pass through the through hole 30 smoothly.

Furthermore, since the channels 22, 24A and 24B are provided so that each sunken portion 21 between the outer projecting strip portions 20 is folded, the diameter of the tapered portion 13 can be equally reduced in the circumferential direction during installation, and the grommet 10 can engage with the through hole of the automobile body panel with a low insertion force.

In addition, after the grommet 10 is mounted on the automobile body panel, even when the wire harness is pulled and a force occurs in a direction from the small-diameter tubular portion 11 side, since the second small-diameter tubular portion 12 is fixed to the wire harness by tape wrapping to resist the force pulling the wire harness, the grommet 10 is prevented from being removed from the panel.

The groove 50 for tactile sensation need not necessarily be V-shaped in cross section. The groove may be formed into U-shape or trapezoid in cross section. Any other suitable complementary shapes for the groove may be utilized to generate sufficient tactile sensation, as will be apparent to those skilled in the art.

Figure 11:
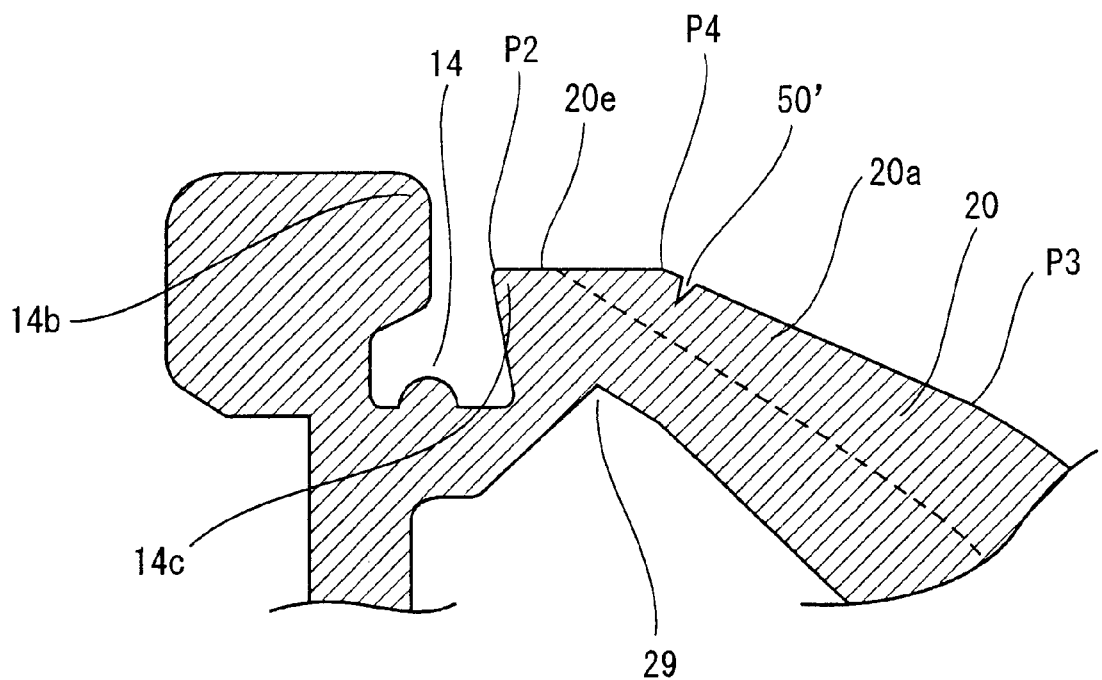
FIG. 11 is a partial cross-sectional view of a grommet according to a second embodiment of the present invention.
Figure 12:
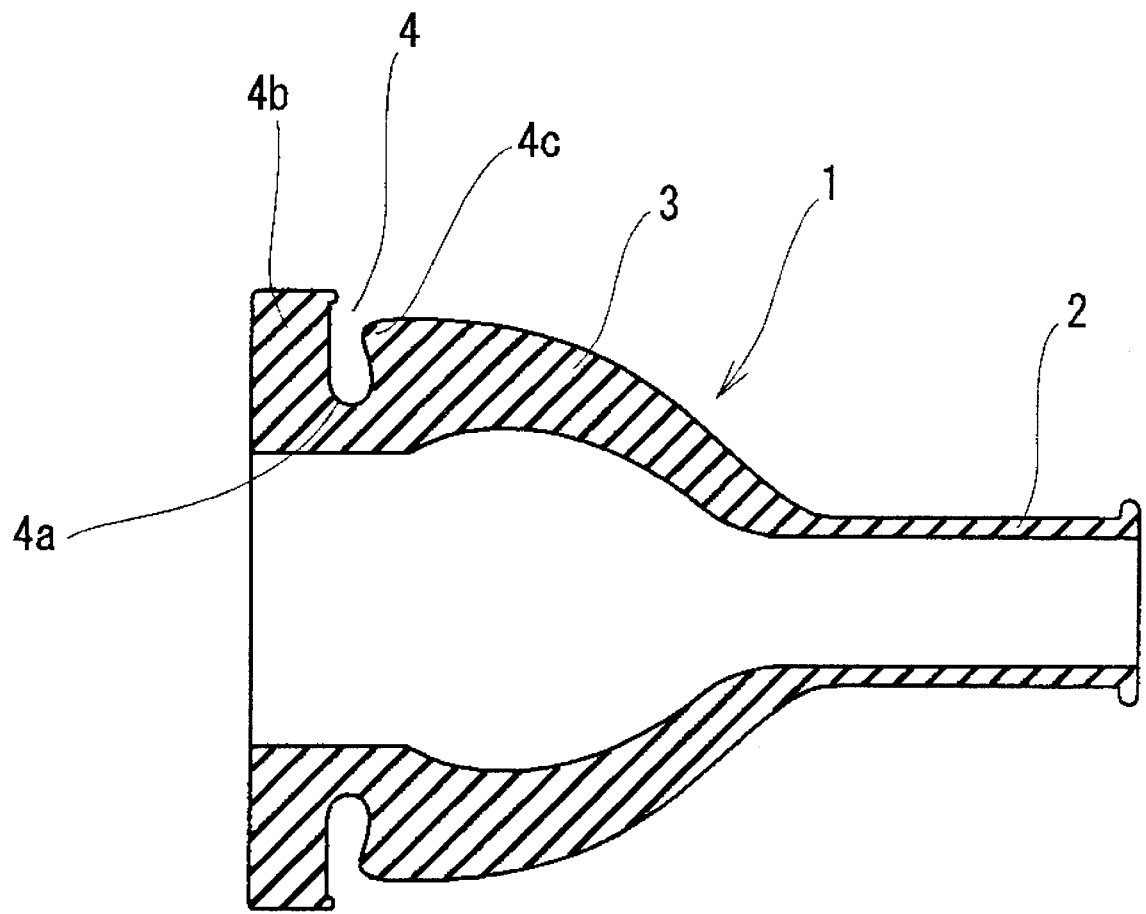
FIG. 12 is a cross-sectional view of a conventional grommet.
Figure 13:
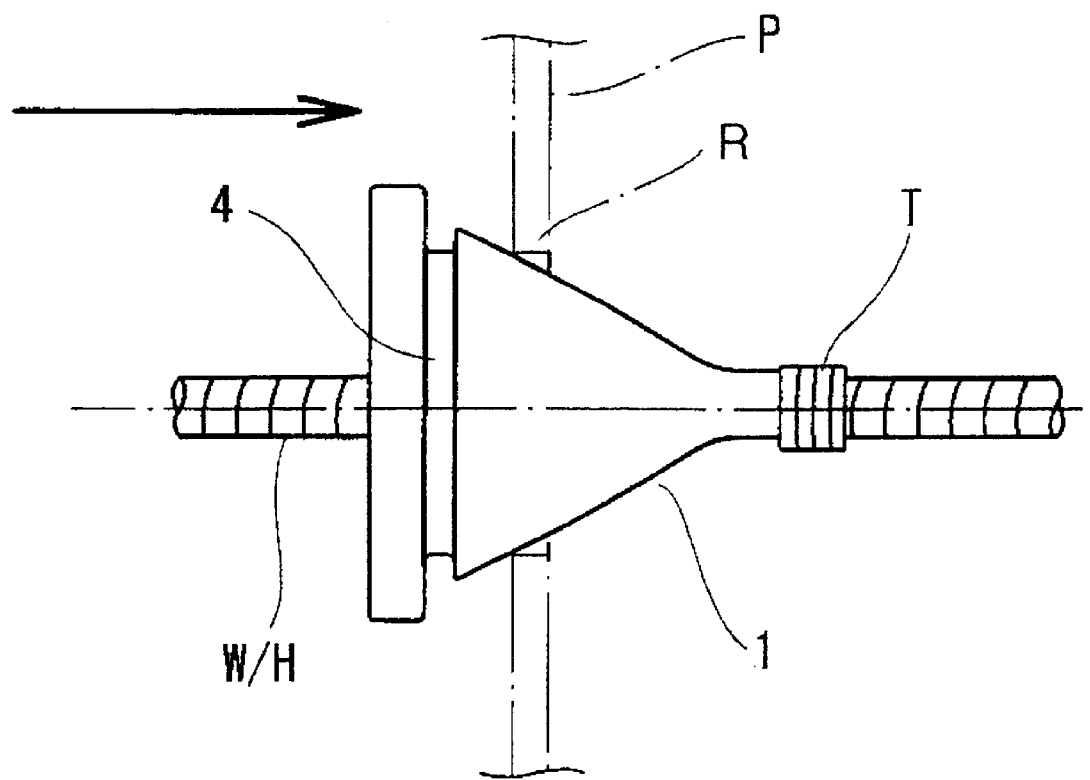
FIG. 13 is a view illustrating an example of an operation in which the conventional grommet of FIG. 12 is inserted into the through hole of a body panel.
Figure 14:
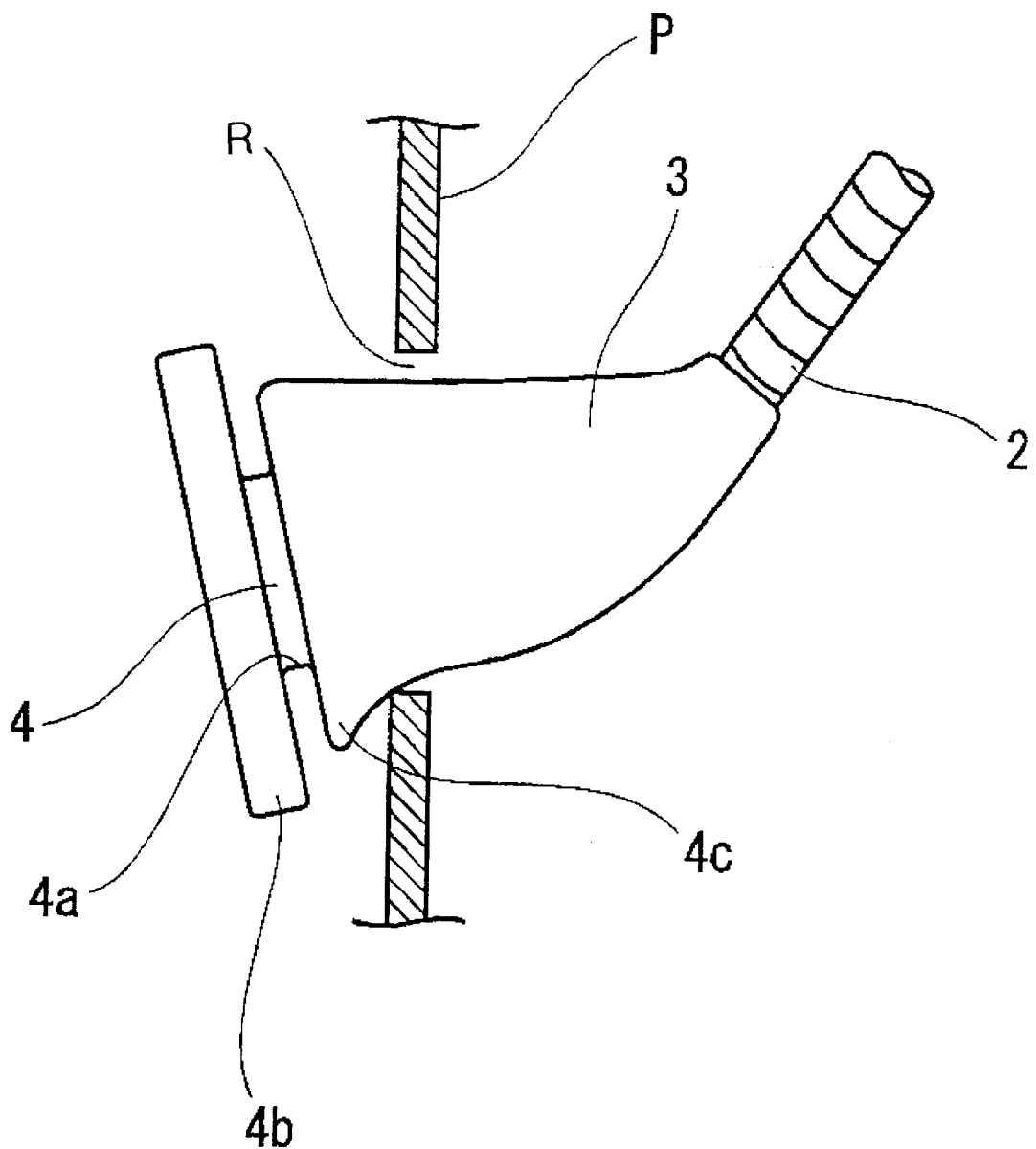
FIG. 14 is a view illustrating a problem of the conventional grommet.

FIG. 11 shows a second embodiment of the present invention. In the second embodiment, the length of the planar surface 20e provided on the outer projecting strip portion 20' is reduced, so that the position P4 is positioned nearer to P2 compared to the first embodiment. A plurality of grooves 50' for tactile sensation are provided on an inclined outer surface 20a of the outer projecting strip portions 20' between P3 and P4, and located in the vicinity of P4. The grooves 50' can achieve similar effects as that of the first embodiment.

The present invention is not limited to the embodiments described above. The number of the outer projecting strip portions is not limited to eight, rather, it can be equal to or more than four, and equal to or less than ten. Thus, the number can be suitably determined based upon the relationship with thickness of the outer projecting strip portions.

Also, the grooves for tactile sensation need not necessarily be provided on each of the outer projecting strip portions. Rather, they can be provided only on some of the outer projecting strip portions.

Further, the cable insertion tubular portion 26 is not always required to be provided.

In addition, needless to say, the through hole can have an oval shape and a grommet having the tapered portion with an oval shape cross section can also be used. Any other suitable complementary shapes for the through hole and the grommet may be utilized, as will be apparent to those skilled in the art.

As clearly described above, the grommet of the present invention has outer projecting strip portions formed on the outer surface of the tapered portion. Grooves for tactile sensation are formed on the outer projecting strip portions at a position close to the edge of the inclined wall. Accordingly, the operator can recognize the tactile sensation immediately prior to the completion of the mounting of the grommet. Thus, it is possible to eliminate the unnecessary operation of pressing the grommet even after the grommet has been mounted in the through hole, thereby reducing burden on the operator.

Further, when the grommet is inserted in an inclining posture, since the projecting strip portions touch the inner peripheral surface of the through hole, an operator can be aware of the inclined insertion and correct the insertion posture.

Further, when one side of the tapered portion of the grommet touches the inner peripheral surface of the through hole due to the inclined insertion, since the outer projecting strip portions increase the stiffness of the tapered portion, the situation in which the tapered portion bends and cannot be inserted, does not occur.

In addition, since channels are formed in the sunken portion between adjacent outer projecting strip portions, extending in the axial direction and spaced from each other in the circumferential direction, the grommet can be easily bent between the outer projecting strip portions to reduce its circumference. Accordingly, when the grommet is inserted in an inclining posture, the posture is easily corrected to a regular posture.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to the subject matter contained in the priority Japanese Application No. 2001-303384, filed on Sep. 28, 2001, which is herein expressly incorporated by reference in its entirety.

What is claimed is:

1. A grommet configured to engage around an outer periphery of a wire harness and to be mounted in a through hole of an automobile body panel, the grommet comprising:

a tubular portion;

a tapered portion extending from one end of the tubular portion, the tapered portion including an automobile body engagement recess provided on an outer peripheral surface of the tapered portion to engage with the automobile body panel;

the recess being formed by a first wall provided around the tapered portion at a large-diameter end and a second wall provided around the tapered portion and located at a small-diameter side of the first wall, the second wall facing the first wall across the recess;

a plurality of outer projecting strip portions provided on an outer peripheral surface of the tapered portion, the plurality of outer projecting strip portions extending from an end adjacent the tubular portion toward an edge of the second wall of the recess in an axial direction of the tapered portion and being spaced from each other in a circumferential direction; and a plurality of grooves provided on the outer projecting strip portions and extending in the circumferential direction, wherein the plurality of grooves are configured to generate tactile sensation when the grommet is mounted into the through hole of the automobile body panel.

2. The grommet according to claim 1, wherein the plurality of grooves are provided in the proximity of an edge of the second wall.

3. The grommet according to claim 1, further comprising:

an inclined surface provided on an outer surface of the plurality of outer projecting strip portions; and a substantially planar surface provided on the outer surface of the plurality of outer projecting strip portions, wherein the substantially planar surface extend from a connecting position to an edge of the second wall in a direction substantially parallel to the axial direction of the tapered portion, the connecting position connecting the inclined surface and the substantially planar surface, wherein the plurality of grooves are provided on the substantially planar surface.

4. The grommet according to claim 3, wherein the plurality of grooves are provided at a location nearer to the connecting position than to the edge of the second wall.

5. The grommet according to claim 1, wherein a projection amount of the plurality of outer projecting strip portions is changed at a first point and a second point, wherein the first point is located substantially at a position where an outer surface of the plurality of outer projecting strip portions first contacts an inner peripheral surface of the through hole when the grommet is inserted into the through hole from the side of the tubular portion, and the second point is located nearer to an edge of the second wall than the first point, wherein an outer surface of the plurality of outer projecting strip portions forms a substantially planar surface that extends from the second point to the edge of the second wall in a direction substantially parallel to the axial direction of the tapered portion.

6. The grommet according to claim 5, wherein the plurality of grooves are provided on the substantially planar surface.

7. The grommet according to claim 6, wherein the plurality of grooves are provided at a position nearer to the second point than to the edge of the second wall.

8. The grommet according to claim 5, wherein the plurality of grooves are provided between the first and second points and disposed at a position close to the second point.

9. The grommet according to claim 1, wherein each of the plurality of grooves has a substantially V-shaped cross section.

10. The grommet according to claim 9, wherein each of the plurality of grooves has an inclination angle θ1 at a side of the second wall and an inclination angle θ2 at the side of the tubular portion, relative to an axis extending perpendicularly to the axial direction of the tapered portion and a longitudinal direction of the groove and passing through the lowermost bottom of the groove, wherein the inclination angle θ2 is greater than the inclination angle θ1.

11. The grommet according to claim 10, wherein the inclination angle θ1 satisfies $0° \leq \theta1 \leq 30°$, and the inclination angle θ2 satisfies $0° \leq \theta2 \leq 80°$, and wherein each of the plurality of grooves has a depth that extends to a location in the proximity of an outer peripheral surface of the tapered portion or that reaches the outer peripheral surface of the tapered portion.

12. The grommet according to claim 1, further comprising a substantially V-shaped recess in an inner peripheral surface of the tapered portion, the V-shaped recess being located in the proximity of the second wall, wherein each of the plurality of grooves is provided on the outer projecting strip portion in the proximity of the second wall at a position opposite to the V-shaped recess.

13. The grommet according to claim 1, further comprising:
   a sunken portion comprising an outer peripheral surface of the tapered portion between adjacent outer projecting strip portions, the sunken portion including at least one channel extending in the axial direction;
   a first substantially planar surface formed on the sunken portion and connecting to an edge of the second wall;
   a second substantially planar surface formed on the outer projecting strip portions and connecting to the edge of the second wall, wherein the second substantially planar surface is substantially coplanar with the first substantially planar surface, and extends farther toward the tubular portion than the first substantially planar surface; and
   wherein each of the grooves is provided at a region of the second substantially planar surface that extends beyond the first substantially planar surface.

14. The grommet according to claim 1, further comprising:
   an end face portion provided at an end of a large-diameter side of the tapered portion; and
   a second tubular portion extending outwardly from the center of the end face portion, the second tubular portion configured to receive at least one fixing element that fixes the second tubular portion to the wire harness, wherein the end face has a greater thickness than the tapered portion not including the outer projecting strip portions.

15. A grommet configured to engage around an outer periphery of a wire harness and to be mounted in a through hole of an automobile body panel, the grommet comprising:
   a tubular portion;
   a tapered portion extending from one end of the tubular portion, the tapered portion including an automobile body engagement recess provided on an outer peripheral surface of the tapered portion to engage with the automobile body panel;
   a plurality of outer projecting strip portions provided on an outer peripheral surface of the tapered portion, the plurality of outer projecting strip portions extending from an end adjacent the tubular portion toward the engagement recess in an axial direction of the tapered portion and being spaced from each other in a circumferential direction; and
   a plurality of grooves provided on the outer projecting strip portions and extending in the circumferential direction, wherein the plurality of grooves are provided in the proximity of the engagement recess so that the grooves generate tactile sensation prior to completion of the mounting of the grommet into the through hole of the automobile body panel.

16. The grommet according to claim 15, further comprising an insertion facilitating recess in an inner peripheral surface of the tapered portion, the insertion facilitating recess being located in the proximity of the engagement recess, wherein the grooves are provided on the outer projecting strip portions in the proximity of the engagement recess at a position opposite to the insertion facilitating recess.

17. A grommet configured to engage around an outer periphery of a wire harness and to be mounted in a through hole of an automobile body panel, the grommet comprising:
   a tubular portion;
   a tapered portion extending from one end of the tubular portion, the tapered portion including an automobile body engagement recess provided on an outer peripheral surface of the tapered portion to engage with the automobile body panel;
   the recess being formed by a first wall provided around the tapered portion at a large-diameter end and a second wall provided around the tapered portion and located at a small-diameter side of the first wall, the second wall facing the first wall across the recess;
   a plurality of outer projecting strip portions provided on an outer peripheral surface of the tapered portion, the plurality of outer projecting strip portions extending in an axial direction of the tapered portion and being spaced from each other in a circumferential direction, the plurality of the outer projecting strip portions being arranged close to each other at a small-diameter end of the tapered portion and being radially spread apart toward a large-diameter end;
   the outer projecting strip portions being bent at a first point and a second point, the first point being located substantially at a position where an outer surface of the plurality of outer projecting strip portions first contacts an inner peripheral surface of the through hole when the grommet is inserted into the through hole from the side of the tubular portion, and the second point being located nearer to an edge of the second wall than the first point;
   a substantially planar surface formed on the outer surface of the plurality of outer projecting strip portions, the substantially planar surface extending from the second point to an edge of the second wall in a direction substantially parallel to the axial direction; and
   a plurality of grooves provided on the substantially planar surface and extending in the circumferential direction, wherein the plurality of grooves are configured to generate tactile sensation when the grommet is mounted into the through hole of the automobile body panel.

18. The grommet according to claim 17, wherein the substantially planar surface is located at the same height as the edge of the second wall.

19. The grommet according to claim 17, wherein the grooves are provided at a position nearer to the second point than to the edge of the second wall.

* * * * *